United States Patent
Tseng et al.

(10) Patent No.: US 9,240,683 B2
(45) Date of Patent: Jan. 19, 2016

(54) OVER-CURRENT REGULATING SYSTEM

(71) Applicant: HON HAI PRECISION INDUSTRY CO., LTD., New Taipei (TW)

(72) Inventors: Hsiang-Pin Tseng, New Taipei (TW); Min-Wei Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 52 days.

(21) Appl. No.: 14/193,160

(22) Filed: Feb. 28, 2014

(65) Prior Publication Data

US 2014/0368959 A1 Dec. 18, 2014

(30) Foreign Application Priority Data

Jun. 13, 2013 (TW) .............................. 102120992 A

(51) Int. Cl.
*H02H 9/04* (2006.01)
*H02H 7/18* (2006.01)
*G05F 1/00* (2006.01)

(52) U.S. Cl.
CPC ... *H02H 7/18* (2013.01); *G05F 1/00* (2013.01)

(58) Field of Classification Search
CPC .......... H02H 9/02; H02H 9/023; H02H 9/025
USPC ......................................................... 361/93.9
See application file for complete search history.

(56) References Cited

U.S. PATENT DOCUMENTS 7,111,180 B2 * 9/2006 Vyssotski et al. ............ 713/300

* cited by examiner

*Primary Examiner* — Dharti Patel
(74) *Attorney, Agent, or Firm* — Novak Druce Connolly Bove + Quigg LLP

(57) ABSTRACT

An over-current regulating system includes a protecting resistor, an amplifying circuit, and a comparing circuit. The protecting resistor is configured to be electrically coupled to a power supply unit. The amplifying circuit is electrically coupled to the protecting resistor and the comparing circuit and configured to amplify a voltage of the protecting resistor, and output the amplified voltage value to the comparing circuit. The comparing circuit is configured to determine whether the amplified voltage is greater than a first predetermined value when the comparing circuit is coupled to the power supply unit. When the voltage is greater than the first predetermined value, the comparing circuit outputs a controlling signal to reduce a work frequency of a load.

18 Claims, 2 Drawing Sheets

OVER-CURRENT REGULATING SYSTEM

FIELD

The present disclosure relates to over-current regulating systems.

BACKGROUND

Electronic devices, such as notebook computers, include a power supply unit, such as a Voltage Regulator Module (VRM). The power supply unit supplies power to a load such as a central processing unit. When an operating frequency of the load increases, a required current of the load may be greater than an over-current tolerance of the power supply unit, which may damage the power supply unit.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
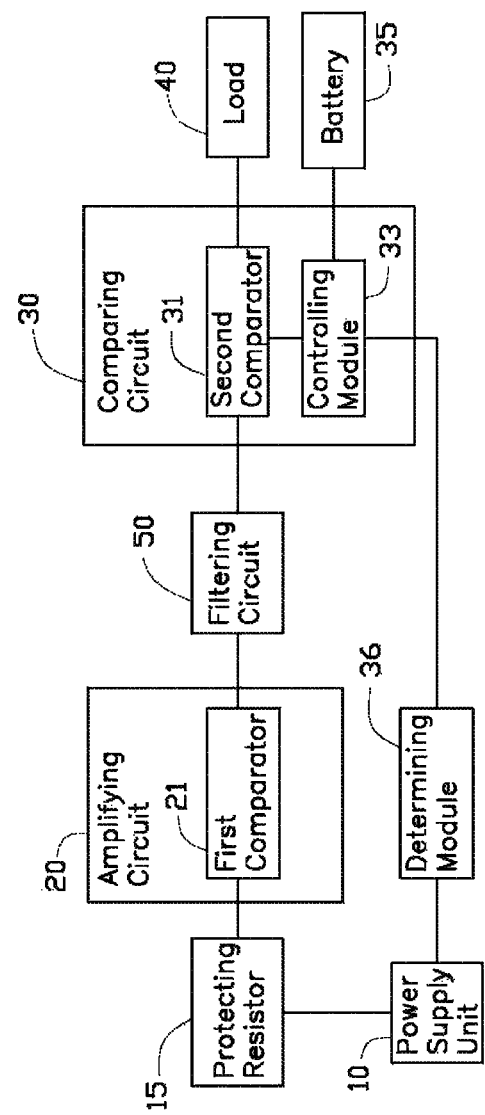
FIG. 1 is a block view of an embodiment of an over-current regulating system.
Figure 2:
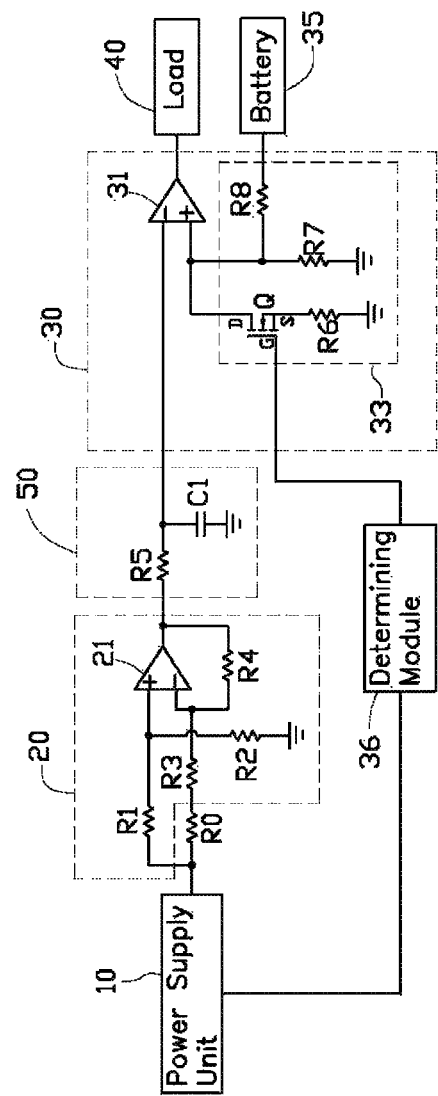
FIG. 2 is a circuit view of the over-current regulating system of FIG. 1.

FIGS. 1 and 2 illustrate one embodiment of an over-current regulating system. The over-current regulating system can include a protecting resistor 15, an amplifying circuit 20, a filtering circuit 50, and a comparing circuit 30. The amplifying circuit 20 can be coupled to a power supply unit 10 through the protecting resistor 15 and amplifies a voltage of the protecting resistor R0. The filtering circuit 50 can be electrically coupled to the amplifying circuit 20 and the comparing circuit 30, to regulate the voltage of the protecting resistor R0. The comparing circuit 30 can be electrically coupled to a load 40. In one embodiment, the load 40 can be a central processing unit (CPU). The power supply unit 10 can be electrically coupled to an adapter (not shown).

FIG. 2 shows that the amplifying circuit 20 can include a first comparator 21, a first resistor R1, a second resistor R2, a third resistor R3, and a fourth resistor R4. The first resistor R1 and the third resistor R3 can be coupled in parallel. A first end of the first resistor R1 can be electrically coupled to the power supply unit 10, and a second end of the first resistor R1 can be electrically coupled to a first end of the second resistor R2 and a positive electrode of the first comparator 21. A second end of the second resistor R2 can be grounded. The protecting resistor R0 (15 labeled in FIG. 1) and the third resistor R3 can be electrically coupled in series. A first end of the protecting resistor R0 and a first end of the third resistor R3 can be electrically coupled to the power supply unit 10, and a second end of the third resistor R3 can be electrically coupled to a first end of the fourth resistor R4 and a negative electrode of the first comparator 21. A second end of the fourth resistor R4 can be electrically coupled to an output end of the first comparator 21.

The filtering circuit 50 can include a fifth resistor R5 and a capacitor C1. A first end of the fifth resistor R5 can be electrically coupled to the output end of the first comparator 21, and a second end of the fifth resistor R5 can be electrically coupled to a first end of the capacitor C1. A second end of the capacitor C1 can be grounded.

The comparing circuit 30 can include a second comparator 31 and a controlling module 33. A negative electrode of the second comparator 31 can be electrically coupled to the fifth resistor R5 and the capacitor C1. The controlling module 33 can include a MOSFET, a sixth resistor R6, a seventh resistor R7, and an eighth resistor R8.

A grid of the MOSFET can be electrically coupled to a determining module 36. A drain of the MOSFET can be electrically coupled to a positive electrode of the second comparator 31, and a source of the MOSFET can be grounded via the sixth resistor R6. The determining module 36 can be electrically coupled to the power supply unit 10 and can determine if a voltage of the power supply unit 10 is greater than a limiting voltage. When the voltage of the power supply unit 10 is greater than the limiting voltage, the determining module 36 can send a high-level signal to switch on the MOSFET. When the voltage of the power supply unit 10 is less than the limiting voltage, the determining module 36 can send a low-level signal to switch off the MOSFET. A first end of the seventh resistor R7 can be electrically coupled to the positive electrode of the second comparator 31, and a second end of the seventh resistor R7 can be grounded. A first end of the eighth resistor R8 can be electrically coupled to the positive electrode of the second comparator 31, and a second end of the eighth resistor R8 can be electrically coupled to the battery 35.

When the power supply unit 10 is in use, the amplifying circuit 20 can amplify a voltage of the protecting resistor 15. The filtering circuit 20 can filter the voltage of the protecting resistor R0. The comparing circuit 30 can determine if the voltage of the protecting resistor R0 is greater than a first predetermined value when the MOSFET is switched on. When the voltage of the protecting resistor R0 is greater than the first predetermined value, the comparing circuit 30 can output a first controlling signal to the load 40 to reduce a work frequency of the load 40. In one embodiment, the controlling signal can be a low-level signal.

When the MOSFET is switched off, the battery 35 can supply power to the load 40. The comparing circuit 30 can determine if the voltage of the protecting resistor R0 is greater than a second predetermined value. When the voltage of the protecting resistor R0 is greater than the second predetermine value, the comparing circuit 30 can output a second controlling signal to the load 40 to reduce an operating frequency of the load 40.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An over-current regulating system comprising:
   a protecting resistor configured to be electrically coupled to a power supply unit;

an amplifying circuit coupled to the protecting resistor and configured to amplify a voltage of the protecting resistor and output an amplified voltage value; and a comparing circuit coupled to the amplifying circuit;

wherein the comparing circuit is configured to determine whether the amplified voltage value is greater than a first predetermined value when the comparing circuit is coupled to the power supply unit, and when the amplified voltage value is greater than the first predetermined value, the comparing circuit outputs a controlling signal, which is configured to reduce a work frequency of a load;

wherein the comparing circuit is further configured to determine whether the amplified voltage value is greater than a second predetermined value greater than the first predetermined value when the comparing circuit is coupled to a battery and disconnected from the power supply unit, and when the voltage value is greater than the second predetermined value, the comparing circuit outputs the controlling signal, which is configured to reduce the work frequency of the load.

2. The over-current regulating system of claim 1, wherein the amplifying circuit further comprises a first resistor, a second resistor, and a first comparator; a first end of the first resistor is configured to be electrically coupled to the power supply unit, a second end opposite to the first end of the first resistor is electrically coupled to an positive electrode of the first comparator and a first end of the second resistor, and the second end opposite to the first end of the second resistor is grounded.

3. The over-current regulating system of claim 2, wherein the amplifying circuit further comprises a third resistor and a fourth resistor, the protecting resistor and the third resistor are arranged in series, and a first end of the protecting resistor and the third resistor is electrically coupled to the power supply unit, and a second end opposite to the first end of the protecting resistor and the third resistor is electrically coupled to a negative electrode of the first comparator and a first end of the fourth resistor, and a second end opposite to the first end of the fourth resistor is electrically coupled to an output end of the first comparator.

4. The over-current regulating system of claim 2, further comprising a filtering circuit coupled to the amplifying circuit and the comparing circuit, wherein the filtering circuit is configured to filter the amplified voltage value.

5. The over-current regulating system of claim 4, wherein the filtering circuit further comprises a fifth resistor and a capacitor, and a first end of the fifth resistor is electrically coupled to an output end of the first comparator, and a second end opposite to the first end of the fifth resistor is electrically coupled to a first end of the capacitor and the comparing circuit, and a second end of the capacitor is grounded.

6. The over-current regulating system of claim 5, wherein the comparing circuit further comprises a MOSFET, the MOSFET is configured to be coupled to the power supply unit via a determining module, the determining module is configured to sends a high level signal to switch on the MOSFET or a low level signal to switch off the MOSFET.

7. The over-current regulating system of claim 6, wherein the comparing circuit further comprise a second comparator, a grid electrode of the MOSFET is configured to be electrically coupled to determining module, a source electrode of the MOSFET is grounded via a sixth resistor, and a drain of the MOSFET is electrically coupled to a positive electrode of the comparator, and a negative electrode of the second comparator is electrically coupled to the fifth resistor, an output end of the second comparator is coupled to the load.

8. The over-current regulating system of claim 7, wherein the comparing circuit further comprises a seventh resistor, a first end of the seventh resistor is electrically coupled to the positive electrode of the second comparator, and a second end of the seventh resistor is grounded.

9. The over-current regulating system of claim 8, wherein the comparing circuit further comprises an eighth resistor, a first end of the eighth resistor is coupled to the positive electrode of the second comparator, and a second end opposite to the first end of the eighth resistor is coupled to the battery.

10. An over-current regulating system, comprising:

a protecting resistor configured to be electrically coupled to a power supply unit;

an amplifying circuit coupled to the protecting resistor and configured to amplify a voltage of the protecting resistor and output an amplified voltage value;

a filtering circuit electrically coupled to the amplifying circuit and configured to filter the amplified voltage value of the protecting resistor;

a comparing circuit coupled to the filtering circuit; and a determining circuit electrically coupled to the power supply unit and configured to determine whether an output voltage of the power supply unit is greater than a limiting voltage, and when the output voltage of the power supply unit is greater than the limiting voltage, a first predetermined value of the comparing circuit is available;

wherein the comparing circuit is configured to determine whether the amplified voltage value is greater than the first predetermined value when the comparing circuit is coupled to the power supply unit, and when the amplified voltage value is greater than the first predetermined value, the comparing circuit outputs a controlling signal to reduce a work frequency of a load.

11. The over-current regulating system of claim 10, wherein the comparing circuit is configured to determine whether the amplified voltage value is greater than a second predetermined value greater than the first predetermined value when the comparing circuit is coupled to a battery and disconnected to the power supply unit, and when the amplified voltage value is greater than the second predetermined value, the comparing circuit outputs the controlling signal to reduce the work frequency of the load.

12. The over-current regulating system of claim 11, wherein the amplifying circuit further comprises a first resistor, a second resistor, and a first comparator; a first end of the first resistor is configured to be electrically coupled to the power supply unit, a second end opposite to the first end of the first resistor is electrically coupled to an positive electrode of the first comparator and a first end of the second resistor, and the second end opposite to the first end of the second resistor is grounded.

13. The over-current regulating system of claim 12, wherein the amplifying circuit further comprises a third resistor and a fourth resistor, the protecting resistor and the third resistor is in series, and a first end of the protecting resistor and the third resistor is electrically coupled to the power supply unit, and a second end opposite to the first end of the protecting resistor and the third resistor is electrically coupled to a negative electrode of the first comparator and a first end of the fourth resistor, and a second end opposite to the first end of the fourth resistor is electrically coupled to an output end of the first comparator.

14. The over-current regulating system of claim 12, wherein the filtering circuit further comprises a fifth resistor and a capacity, and a first end of the fifth resistor is electrically coupled to an output end of the first comparator, and a second end opposite to the first end of the fifth resistor is electrically coupled to a first end of the capacity and the comparing circuit, and a second end of the capacity is grounded.

15. The over-current regulating system of claim 14, wherein the comparing circuit further comprises a MOSFET, the MOSFET is configured to be coupled to the power supply unit via the determining module, the determining module is configured to sends a high level signal to switch on the MOSFET or a low level signal to switch off the MOSFET.

16. The over-current regulating system of claim 15, wherein the comparing circuit further comprises a second comparator, a grid electrode of the MOSFET is electrically coupled to determining module, a source electrode of the MOSFET is grounded via a sixth resistor, and a drain of the MOSFET is electrically coupled to a positive electrode of the comparator, and a negative electrode of the second comparator is electrically coupled to the fifth resistor, an output end of the second comparator is coupled to the load.

17. The over-current regulating system of claim 16, wherein the comparing circuit further comprises a seventh resistor, a first end of the seventh resistor is electrically coupled to the positive electrode of the second comparator, and a second end of the seventh resistor is grounded.

18. The over-current regulating system of claim 17, wherein the comparing circuit further comprises a eighth resistor, a first end of the eighth resistor is coupled to the positive electrode of the second comparator, and a second end opposite to the first end of the eighth resistor is coupled to the battery.

* * * * *